(No Model.)

R. H. EDMISTON.
TRIGONOMETRICAL ELUCIDATOR.

No. 570,157. Patented Oct. 27, 1896.

Witnesses
Inventor
Robert H Edmiston

UNITED STATES PATENT OFFICE.

ROBERT H. EDMISTON, OF LOS ANGELES, CALIFORNIA.

TRIGONOMETRICAL ELUCIDATOR.

SPECIFICATION forming part of Letters Patent No. 570,157, dated October 27, 1896.

Application filed September 23, 1895. Serial No. 563,423. (No model.)

*To all whom it may concern:*

Be it known that I, ROBERT H. EDMISTON, a citizen of the United States, residing at Los Angeles, in the county of Los Angeles and State of California, have invented a new and useful Trigonometrical Elucidator, of which the following is a specification.

The object of my invention is to provide a more simple and convenient appliance for use of teachers of trigonometry by which the teacher can quickly and clearly illustrate the relations of different parts of a circle viewed in its entirety.

The accompanying drawings illustrate my invention.

Figure 1:
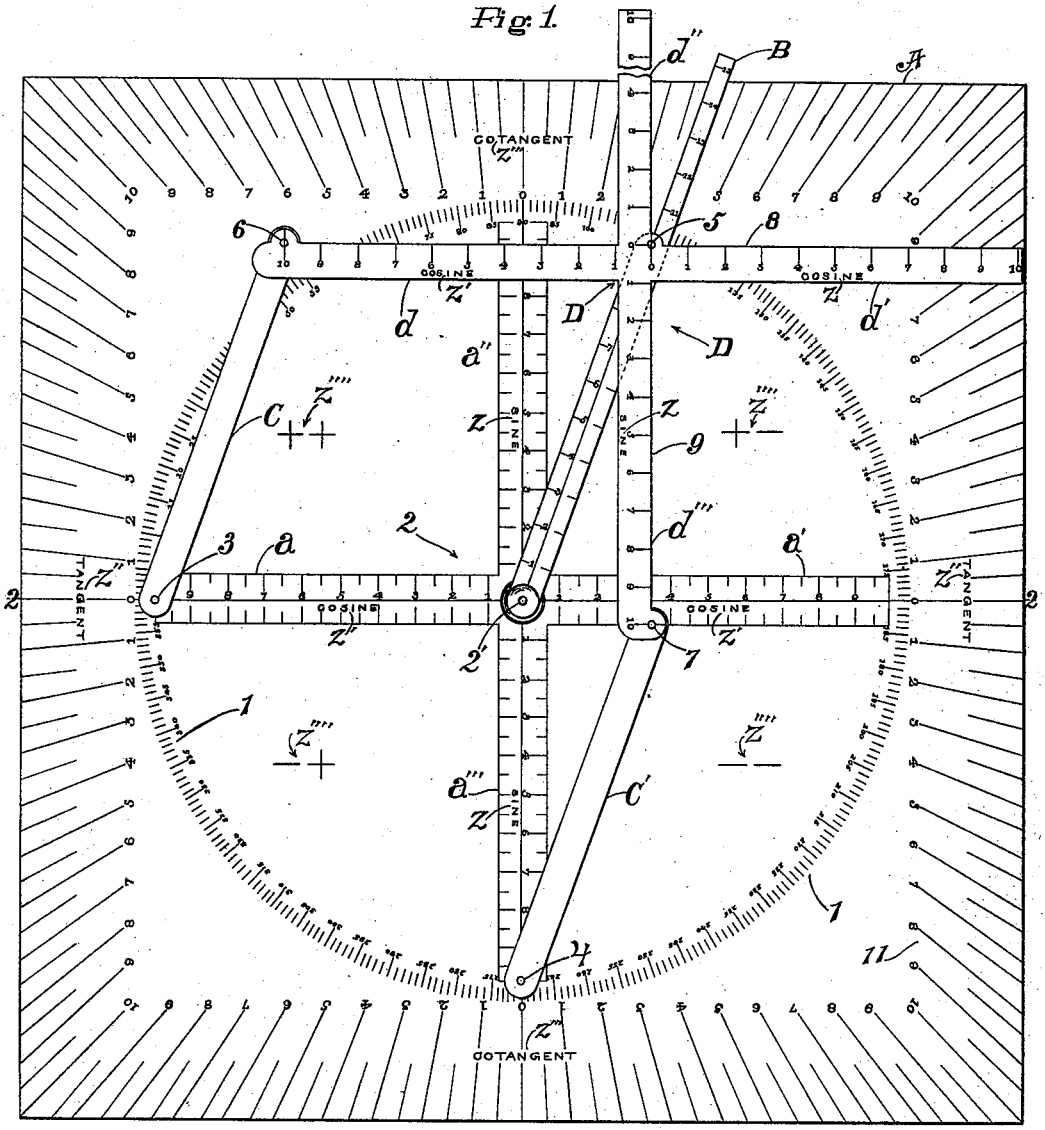
Figure 2:
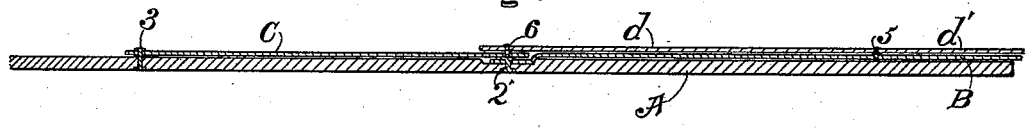

Figure 1 is a plan view of my newly-invented instrument, showing the same adjusted to measure an angle of one hundred and ten degrees. Fig. 2 is a cross-section taken on line indicated by 2 2 on Fig. 1 and showing the parts adjusted to measure an angle of one hundred and eighty degrees.

A indicates the diagram-card, provided with a diagram consisting of a graduated circle 1, a rectangular cross 2, having its intersection 2' at the center of the circle and its arms extending to the circumference of the circle, and the graduated square 11, showing the tangent and cotangent.

B indicates a radial arm pivoted at 2' at the center of the graduated circle and extending to the circumference of the circle.

C C' indicate parallel guide-arms pivoted by pivots 3 4, respectively, on the mid-lines of two adjacent arms $a$ $a'''$ of the diagram-cross 2 at distances from the center respectively equal to the radius. The graduations of the circle are preferably marked outside the circle for convenience of reading.

D indicates the graduated sine and cosine right-angle cross-bar, which is pivoted to the radial arm by a pivot 5 and to the parallel guide-bars C C' by pivots 6 and 7, respectively, arranged upon the intersecting edges 8 9 of such cross-bar at distances apart equal to the radius of the circle 1, and the distances between the pivots 2' and 5, pivots 3 and 6, pivots 5 and 6, pivots 5 and 7, pivots 2' and 3, pivots 2' and 4, and pivots 4 and 7 are respectively equal to the radius of the circle 1—that is to say, the pivots are so arranged that the inter-pivotal space on each arm is equal to the radius of the circle.

The arms $d$, $d'$, $d''$, and $d'''$ of the cross-bar D are to be graduated into tenths, hundredths, and thousandths or any other desired scale, the radius of the circle 1 being one, and the arms $a$, $a'$, $a''$, and $a'''$ of the diagram-cross 2 are to be likewise graduated, and the tangent and cotangent diagram-square 11 is also to be likewise graduated. The arms of the diagram-cross 2 are graduated from the center outward and the tangent and cotangent are graduated from the mid-lines of the diagram-cross. The arms of the cross-bar D are graduated from the intersection-pivot 5. The radial arm is graduated from the central pivot 2' and it extends beyond the intersection-pivot 5 outward a sufficient distance to measure the tangent or cotangent. It may be of any desired length.

On the drawings I have indicated a circle having the horizon for zero, and the different numbers of the instrument are marked to correspond with such a circle. The diagram shows the different trigonometrical expressions Z Z', &c., marked with relation to such a circle. Measuring from zero, the arms $a$ $a'$ of the cross measure the cosine, and the vertical arms $a''$ $a'''$ measure the sine. The horizontal arms $d$ $d'$ of the cross-bar D measure the cosine and indicate its movements in the measurement of different angles, and the vertical arms $d''$ $d'''$ of the cross-bar measure the sine and indicate its movements in measuring different angles. The radial arm B serves as an indicator to show the angle measured and it also gives the secant and the cosecant.

It is to be understood that the trigonometrical expressions indicated will be reversed when the measure is made in reverse directions.

The cross-bar and the arms attached thereto can be swung around to describe an entire circle and will measure any angle desired. The radial arm B is countersunk at its pivotal point into the diagram-card A, so that the free ends of the parallel guide-arms C C' will pass over the same without interference.

By providing two guide-arms C and C', I avoid any dead-center, but the instrument would serve a practical purpose were either one of the arms C or C' dispensed with, care being taken when moving the arms to hold the parts in proper adjustment when passing the dead-center.

I will now describe the operation of the several parts when the elucidator is in use.

The movable parts will be adjusted to bring the radial arm to the angle to be measured. As the parts move, the horizontal arms $d\ d'$ of the cross-bar will remain constantly parallel with the horizontal arms $a\ a'$ of the diagram-cross and will measure the cosines of the different angles through which the radial arm passes. As the angle is increased or decreased the horizontal arms of the cross-bar measure the increase or the decrease of the cosine, the measurements reading from the center line of the vertical arms of the diagram-cross; and the sine is measured by the vertical arms $d''\ d'''$ of the cross-bar, reading from zero on the cross-bar to the mid-line of the horizontal arms of the diagram-cross. The sine and cosine will thus be indicated as increasing or decreasing, as the case may be. The readings may be taken from both the cross-bar and the cross. In Fig. 1 the cosine is indicated as increasing and the sine as decreasing as the cross-bar is moved to the right and as the angle increases. The horizontal arms of the cross-bar will remain parallel with the horizontal arms of the cross and the vertical arms of the cross-bar will remain parallel with the vertical arms of the cross and the correct measurements will be given throughout the entire movement around the circle.

Now, having described my invention, what I claim as new, and desire to secure by Letters Patent, is—

1. The trigonometrical elucidator set forth comprising the diagram-card; the radial arm and guide-arm pivoted thereto, and the cross-bar pivoted to the radial arm and guide-arm substantially as set forth.

2. The combination of the diagram-card; the radial arm and the two guide-arms pivoted thereto; and the cross-bar pivoted to the radial arm and guide-arms substantially as set forth.

3. The trigonometrical elucidator set forth comprising the diagram-card; the guide-arm pivoted to such diagram-card; the radial arm pivoted to the diagram-card and countersunk into such card at its pivotal end to allow the end of the parallel arm to swing thereover without interference; and the cross-bar pivoted to the radial arm and the guide-arm.

4. The trigonometrical elucidator set forth comprising the diagram-card provided with a graduated circle and with a rectangular diagram-cross having its intersection at the center of the circle and its arms extending to the circumference of the circle: the radial arm pivoted to the card at the center of the circle, and extending to the circumference of the circle: the guide-arm pivoted at the junction of the circumference of the circle and one arm of the diagram-cross: and the rectangular cross-bar pivoted at its center to the radial arm at a point on said arm which touches the circumference of the circle, and having one of its arms pivoted to the free end of the guide-arm: the pivots being so arranged that the interpivotal space on each arm is equal the radius of the circle.

ROBERT H. EDMISTON.

Witnesses:
JAMES R. TOWNSEND,
ALFRED I. TOWNSEND.